May 10, 1927.
D. H. SHOGRAN
GAS CONTROL
Filed Aug. 17, 1926
1,628,337
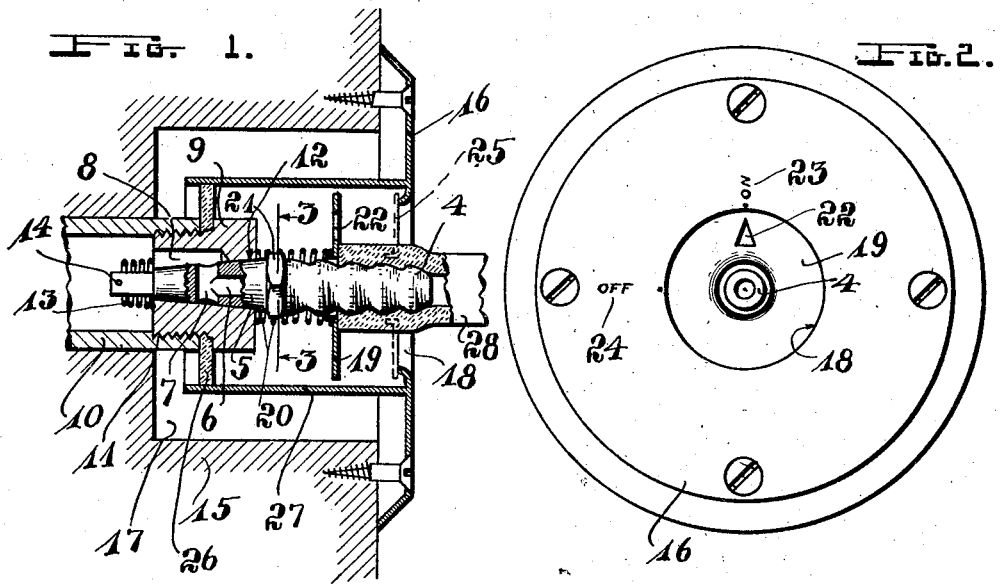
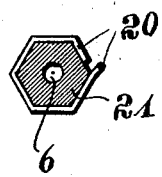
INVENTOR:
DAVID H. SHOGRAN,
By: *Otto P. Ringer,*
his Atty.

Patented May 10, 1927.

1,628,337

UNITED STATES PATENT OFFICE.

DAVID H. SHOGRAN, OF SAN DIEGO, CALIFORNIA.

GAS CONTROL.

Application filed August 17, 1926. Serial No. 129,764.

This invention relates to devices for controlling the flow of gas from the terminals within a wall.

One of the objects of this invention is to provide a valve or cock that can be manipulated by the end of a gas hose inserted through an opening in a wall.

Another object is to provide an indicating plate yieldingly interconnected with the gas cock by which the position of the gas cock may be ascertained when the gas hose is removed, adapted to yield when the gas hose is slipped over the cock.

Another object is to provide a cover plate by which the yielding indicating plate is held in place within the wall, so that the gas cock is also covered up and inclosed except for the front end protruding from the wall through this cover plate.

Other objects will appear from the following description and appended claims as well as from the accompanying drawing, in which—

Fig. 1 is a fragmentary general midsectional view of an enclosure for a gas pipe terminal, having a gas cock in proper position and provided with indicating and covering means embodying this invention.

Fig. 2 is a front elevation of the cover plate illustrating the indicating plate in proper position behind the opening of the cover plate over the front end of the gas cock.

Fig. 3 is a cross section through the gas cock on line 3—3 of Fig. 1.

Gas cocks protruding fully from the wall of a house are subject to the risk that children may meddle with them.

It is therefore desirable to enclose such gas cocks in the wall. At the same time it is desirable that such a structure be as simple as possible without requiring special hose connections.

As illustrated in the drawing, the nipple end 4 of the cock 5 is of the customary plain grooved type over which the rubber nipple of a gas hose may be slipped. The gas cock in this case, however, is provided with a central bore 6 in conjunction with a cross bore 7 to communicate and align with a longitudinal bore 8 in the plug 9 when the cock is opened. The plug 9 is threadedly engaged with the terminal 10 of a gas pipe, as indicated at 11. The plug 9 is provided with a conical bore 12 for the gas cock 5 and also with the bore 8, referred to above, parallel and adjacent to the conical bore. The spring 13 in conjunction with pin 14 serves to hold the cock 5 seated within the plug 9.

The whole structure of the pipe terminal 10 with the plug 9 and the cock 5 is disposed within a recess of a wall 15 with a front nipple 4 of the gas cock preferably to a small extent or not at all protruding from the wall.

A gas cock of this type can easily be turned by means of a gas hose, slipped with its rubber end nipple over the gas cock nipple 4. A cover plate 16 is provided to close the front end of the recess 17 in the wall. This cover plate is provided with an opening 18 of a suitably large size in order to facilitate the applying of a rubber end of a gas hose. The hole 18 is preferably large enough to allow an insertion of a gas-hose to abut against a yielding indicating plate 19. This yielding plate is suitably larger than the opening 18 in order to be kept within the wall recess 17 by the cover plate 16. A spring 20 is inserted between the plug 9 and the yielding indicating plate 19, by which the indicating plate is yieldingly held against the cover plate 16. The spring 20 is preferably wound in hexagonal spirals to engage over the hexagonal portion 21 of the gas cock, in order to transmit any turning motion of the gas cock to the indicating plate 19. An indicating mark 22 is provided on the indicating plate to come into an alignment with certain indications 23 or 24 on the cover plate, depending on the position of the gas cock.

In Fig. 1 a portion of a rubber nipple 28 of a gas hose is illustrated in engaging position on the nipple 4, disposed through the hole 18 in the cover plate 16, with its front end pressing against the indicating plate 19, so that this indicating plate is pressed inwardly away from the cover plate. When the hose is removed from the nipple the indicating plate 19 takes the position indicated in dotted lines at 25 directly behind the cover plate 16, thereby giving a neat closed appearance around the centrally disposed nipple 4, the front end of the nipple merely protruding from the indicating plate 19 in such an inoperative position.

A packing or sealing washer 26 is disposed between the termination of the gas pipe 10 and the plug 9, the sealing washer being of a size to seal the recess 17 from the outside by being firmly inclosed by tube extension 27 from the rear of the cover plate 16.

Having thus described my invention, I claim:

1. A gas-control comprising, in combination with a gas supply pipe embedded in a wall with the end of the pipe terminating within a recess of the wall, a gas-cock with connecting nipple longitudinally disposed in the end of said pipe and so as to protrude from said recess, a cover-plate disposed over said recess and having an opening through which a gas hose may be applied over said nipple, and an indicating plate of a size to close said opening from the rear of the cover-plate and operatively and yieldingly connected to the said cock to indicate the position of the cock through the opening when the hose is removed.

2. A gas-control comprising, in combination with a gas supply pipe embedded in a wall with the end of the pipe terminating within a recess of the wall, a gas-cock with connecting nipple longitudinally disposed in the end of said pipe and so as to protrude from said recess, a cover-plate disposed over said recess and having an opening through which a gas hose may be applied over said nipple and having indicating means on its outside face, and an indicating plate operatively and yieldingly connected to the said cock to be rotated with the cock and having means to align with the indicating means on the cover-plate for indicating the position of the cock.

3. A gas-control comprising, in combination with a gas supply pipe embedded in a wall with the end of the pipe terminating within a recess of the wall, a gas-cock with connecting nipple longitudinally disposed in the end of said pipe and so as to protrude from said recess, a cover-plate disposed over said recess and having an opening through which a gas hose may be applied over said nipple and having indicating means on its outer face, an indicating plate of a size to close said opening from the rear and having indicating means on its front face to align with the indicating means on the cover-plate, the said cock having means to support a connecting member, and a spring operatively engaged with said support means of the cock to be rotated with the cock and being also operatively connected to the indicating plate to transmit the rotating movements of the cock to the indicating plate, the spring serving also to hold the indicating plate against the rear of the cover-plate when no hose is on the nipple of the cock so as to close the opening of the cover-plate and adapted to yield when the nipple of a hose is slipped over the nipple of the cock.

4. A gas-control comprising, in combination with a gas supply pipe embedded in a wall with the end of the pipe terminating within a recess of the wall, a gas-cock with connecting nipple longitudinally disposed in the end of said pipe, a cover-plate disposed over said recess and having an opening through which a gas hose may be applied over said nipple and having a tubular member extending from the rear of the cover-plate into said recess around said pipe end, sealing means between the said pipe end and the tubular member to prevent an escape of gas from the cock into the wall, and an indicating plate operatively supported by the gas-cock and adapted to close said opening around said nipple of the cock.

In testimony that I claim the foregoing as my invention I have signed my name.

DAVID H. SHOGRAN.